US 6,615,261 B1

(12) United States Patent
Smørgrav

(10) Patent No.: US 6,615,261 B1
(45) Date of Patent: Sep. 2, 2003

(54) PERFORMANCE ANALYSIS OF DATA NETWORKS USING A NORMALIZED SAMPLING METHOD

(75) Inventor: Axel-Stéphane Smørgrav, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/498,342

(22) Filed: Feb. 4, 2000

(30) Foreign Application Priority Data

Dec. 3, 1999 (NO) .......................................... 19995974

(51) Int. Cl.[7] .......................................... G06F 15/173
(52) U.S. Cl. ...................................... 709/224; 709/223
(58) Field of Search .................................. 709/223–224

(56) References Cited

U.S. PATENT DOCUMENTS

| 6,061,723 A | | 5/2000 | Walker et al. | |
|---|---|---|---|---|
| 6,115,743 A | * | 9/2000 | Cowan et al. | ............... 709/224 |
| 6,249,755 B1 | | 6/2001 | Yemini et al. | |
| 6,411,997 B1 | * | 6/2002 | Dawes et al. | ............... 709/224 |

OTHER PUBLICATIONS

"HP OpenView Network Node Manager 6.0, from the UNIX and Windows NT® operating system, Product Brief", *Hewlett–Packard Company*, 1998; pp. 1–4.
"HP OpenView Network Node Manager 6.1, for the UNIX and Windows NT® operating system", Hewlett–Packard Company; pp. 1–5. 1999.
"Hp OpenView network node manager 6.2, for HP–UX, Sun Solaris and Windows NT/2000 operating system Product Brief", *Hewlett–Packard Company*, Jul. 2001; pp. 1–6.

* cited by examiner

*Primary Examiner*—David Wiley
*Assistant Examiner*—Joseph E Avellino

(57) ABSTRACT

The present invention relates to a method for performance analysis of data networks where data is collected as measurement samples from the individual network elements at in-synchronous sampling intervals and stored in a Performance Database. Said database is maintained by a Performance Local Agent, which stores collected data in the database, retrieves data from the database on request from a client, processes the data and provides clients with a view of the data. According to the invention, measurement samples are normalised by interpolation so as to appear as samples sampled at exactly the same sampling times.

6 Claims, 4 Drawing Sheets

PERFORMANCE ANALYSIS OF DATA NETWORKS USING A NORMALIZED SAMPLING METHOD

This application claims priority under 35 U.S.C. §§119 and/or 365 to 19995974 filed in Norway on Dec. 3, 1999; the entire content of which is hereby incorporated by reference.

BACKGROUND

The present invention relates to performance analysis of data networks.

In order to follow up on network performance, a network manager needs to monitor the network's vital parameters. He needs to know if any part of the network is congested at any time, or if the traffic growth in a part of the network will necessitate action in the immediate future to increase the capacity, restructure the network or modify the routing in order to avoid future perturbances in the network operation. If parts of the network are over-provisioned, he might want to reduce the capacity of certain links in order to reduce network operating costs.

Performance data can be used to detect problems that arise during network operation, or to detect trends in the network so that corrective action can be taken before a problem develops.

The data collected from the network can be exploited either manually by an operator, or automatically by report generators, correlation tools and even systems that can automatically respond to anomalies in the network by actively doing a reconfiguration to solve a detected problem.

Network elements maintain counters that can be used to get a picture of traffic, error rates etc. at that specific point in the network. The values of such counters can be retrieved in a variety of manners, depending on the capabilities of the network element, and the kind of management functions (protocols) that it supports.

The most common datacom management protocol is SNMP (Simple Network Management Protocol). This protocol supports retrieval of specific data objects from a network element in a query/reply fashion. Other alternative protocols are FTP or Telnet.

It is often desirable to apply mathematical functions to data objects retrieved from network elements, or somehow compare the values of these data objects. This makes sense only if the values that participate in the calculation (or the comparison) are sampled at the same time.

As an example of such a calculation, let's for example assume that we retrieve the objects ifOutOctets (number of octets sent on the interface), ifInOctets (number of octets received on the interface) and ifSpeed (interface transmission rate in bits per second) from a network element, for a specific half-duplex interface, and we wish to calculate Bandwidth Utilisation (BU) as the ratio between traffic (ifOutOctets+ifInOctets), and the available bandwith (ifSpeed).

$$BU=(ifOutOctets+ifInOctets)*8/ifSpeed$$

Especially since a lot of the data retrieval is done using the query/reply paradigm, we cannot assume that samples for several data objects can be retrieved from network elements simultaneously. If the values used for ifOutOctets and ifInOctets in the above expression are not sampled simultaneously, the result might turn out to be significantly wrong.

There are several reasons why we cannot assume that multiple objects can be retrieved simultaneously. First of all this would result in clusters of data retrievals around specific times. The computer system may not have the capacity to process that amount of data with an acceptable delay, and these bursts of network traffic may result in traffic delays and even network congestion. In the other end, the network element needs to respond virtually instantaneously to all the queries, which requires a sufficient amount of processing power which should be used to the network elements primary task, i.e. forwarding data.

What we really might want is to define measurements starting at a specific time, with a specific sampling frequency. However, by doing so we will get sampling clusters since a large number of the measurements will inevitably be defined to start at the same minute past the hour, with the same sampling frequency. It would therefore be better to randomise the start of the measurements within some reasonable interval.

Due to the inability to read and reset a timer simultaneously (except when this function is supported by the timer hardware), and that multiple timers are emulated in software, the actual measurement intervals will skew some fractions of a second in time for each period.

Another problem that has to be addressed is that one might want to compare to data objects sampled at different intervals.

HP OpenView Network Node Manager is a network management tool, providing in-depth views of the network in a graphical format. The tool discovers network devices and provides a map of the network. The map indicates which devices and network segments are healthy and which areas need attention, e.g. if a device fails the Network Node Manager evaluates the event stream and pinpoints the cause of the failure. The Network Node Manager also includes an SNMP data collector that can be configured to retrieve data from network elements at specified time intervals, and provides graphing utilities for browsing both old data as well as incoming data in real time.

However, to our knowledge, HP Openview snmpcollect/xnmgraph does not perform time normalisation as described in this document.

SUMMARY

The fundamental idea presented in this document is to use linear interpolation to calculate measurement values for an arbitrary time, independently of the time the measurement was started, and the sampling frequency. This process is what we will refer to as time normalisation.

We present a set of computation stages and techniques to provide a performance analysis tool with performance data collected from the network, that are suitable for ulterior analysis, or data computationally derived from data collected from the network.

The exact scope of the invention is as defined in the appended patent claims.

BRIEF DESCRIPTION OF THE DRAWINGS

The invention will now be further described with reference to the accompanying drawings, in which.

DETAILED DESCRIPTION

Figure 1:
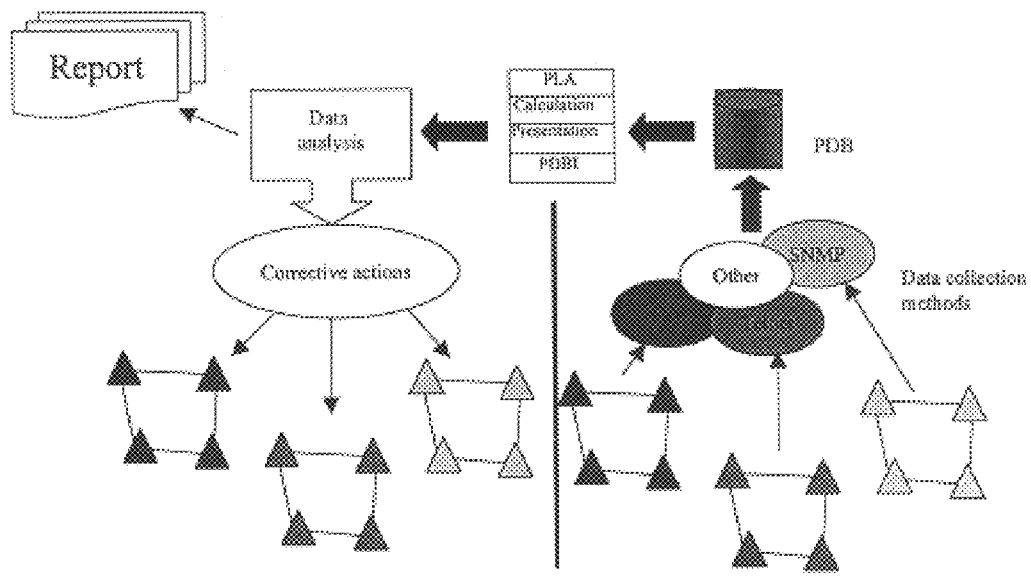
FIG. 1 illustrates the data collection and analysis process as used in the present invention
Figure 2:
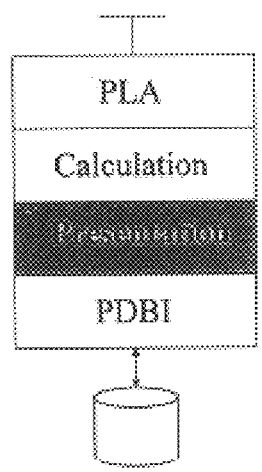
FIG. 2 shows the layering of the Performance Local Agent used in the data collection system.

FIG. 1 illustrates the data collection and analysis process. Data is collected from the network elements using the appropriate method, depending on the network element capabilities or the preferred collection method. Collected samples are stored in the Performance Database (PDB) for ulterior retrieval. Among performance system clients we will find tools ranging from simple graphing tools to sophisticated analysis software capable of generating a bill of health for the network or even take corrective action with no operator interaction.

DERIVED OBJECTS

Derived objects are objects which values are defined as a mathematical function of real objects collected from the network elements.

Derived objects will be defined in the network element type configuration file as all other objects. The information that needs to be included in a derived object definition is the name of the derived object a description of the derived object a unit, e.g. "%"

a mathematical expression

From an external point of view, a derived object should appear to be just like a real object, i.e. an object available on a network element.

In order to simplify parsing and interpretation of the expressions describing the derived objects, we suggest using arithmetic postfix notation. Using an example expression with objects taken from the MIB-2 interface group $$\frac{ifOutOctets * 8}{ifSpeed} * 100$$

the postfix-expression will be ifOutOctets 8* ifSpeed/100* ifOutOctets 8* ifSpeed/ **

The advantage of using postfix notation is that the associativity is implicit, and the grammar is parsable by an LL(1) parser. The algorithm would consist in pushing all symbols on the stack until an operator is encountered, upon which 2 operands are popped from the stack, the result is computed and pushed back onto the stack. The algorithm is repeated until the parser either runs out of expression string, or the stack is empty. If both occur at the same time, the expression is correct.

The inconvenience is that the expressions are not intuitively obvious to the untrained eye.

PERFORMANCE LOCAL AGENT (PLA)

PLA is the external interface of the data collection system. The task of PLA is to store new jobs in the Performance Database (PDB) and retrieve data on request from a client. Database access is done through the PDB Interface (PDBI).

In addition to just retrieve the data from PDB and deliver it to the requesting client, PLA will also be capable of doing additional processing of the data. PLA will hence be able to compute the values of derived objects, calculate the values of objects at exact time intervals by interpolating sample data in PDB, and by this provide clients with an abstract view of the data.

For comparison purposes it is necessary for a client to be able to retrieve values for a pair of data objects sampled at the exact same times. Also for the sake of computation of derived objects, it is necessary to obtain values for the objects participating in the derived object expression that are sampled at the exact same times.

Since we do not believe that it is possible to obtain samples for measurement objects at the exact same time, we will have to perform some computations on the sample data to calculate intermediary values for the exact times we need samples.

Another relevant issue is that a large number of the objects that we are interested in collecting are counters. We define a counter as a register which value increases monotonically until the register overflows in which case it is reset to zero plus the overflow, as opposed to a gauge which gives an instantaneous value for some parameter, e.g. CPU load. For some data, the performance data collector might use an external data collector to do the data collection per se, and only parse the collected data, which are subsequently stored in PDB. In this case the external data collector takes care of handling the wrapping of the register, and the value reported is the delta between two subsequent samples.

Performance manager must treat data not collected by an external collector providing the above-described functionality, i.e. delta calculation must be performed at some point.

The calculation could be done in real-time, i.e. at the time the data is actually received from the network element, and the calculated data stored in the database together with real-object values, but that might possibly have a severe impact on the capacity of the system to perform data collection, and will increase the database transaction rate. Calculation of the value of derived object also depends on several real-object values that have to be time-normalised prior to calculation of the derived object value.

The best solution is therefore to do the calculation at the time the data are requested by a client application.

In any case, the performance manager will need to know how to treat the data according to whether they are counter-data or gauges.

Presentation Layer

The task of the PLA Presentation Layer is to deliver measurement values to the above layer, which are normalised with respect to time.

A measurement sample is the content of a register retrieved from a network element, with no further processing by the performance management system, as opposed to a measurement value which is the result of the application of a function on the corresponding measurement samples.

The time normalisation process consists in calculating measurement values for a performance parameter, at specific times, usually defined by an initial time and a delta increment.

Notation

We will denote sampling times, i.e. the times at which samples were collected, as $t_i$ for $i \leq 0$, normalized times as $T_i = T_0 + i*T$ for $i > 0$.

For value of a measurement sample at time t we will use the notation s(t), and v(t) for the corresponding measurement value.

Calculating Measurement Values

Figure 3:
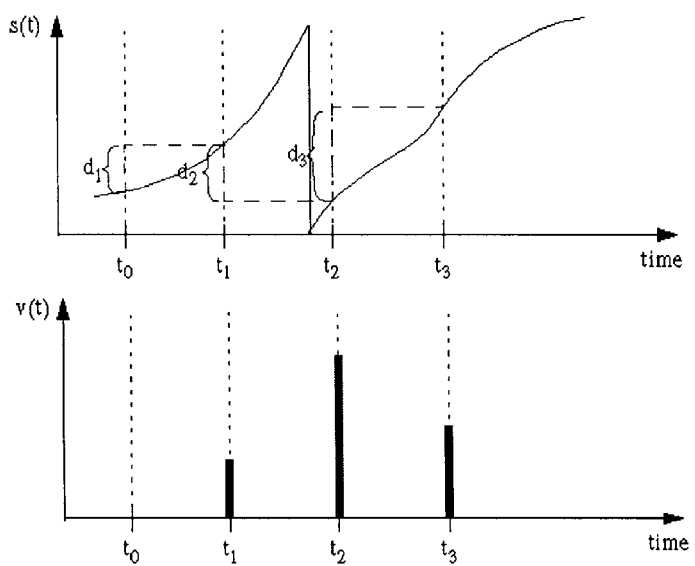
FIG. 3 is a graph showing counter wrap-around and the corresponding measurement values calculated as the difference between measurement samples.

In FIG. 3 the first graph shows the evolution of a counter which includes a wrap-around between times $t_1$ and $t_2$. The second graph shows the corresponding measurement values determined by calculating the difference between measurement samples.

In most cases a measurement value can be expressed as $v(t_i) = s(t_i) - s(ti_{i-1})$ for i>0. However if a counter wraparound is detected (by the fact that $s(t_i)<s(ti_{i-1})$), the calculation will have to be $v(t_i)=s_{max}+s(t_i)-s(t_{i-1})$ where $s_{max}$ is the maximum integer containable by the counter.

Figure 4:
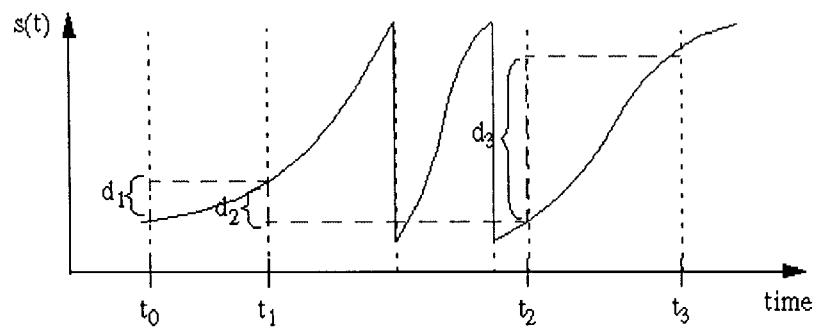
FIG. 4 shows multiple wrap-arounds during a sampling interval, which will get undetected.

In the case of multiple counter wrap-arounds during a sampling interval, as illustrated in FIG. 4, the calculation will yield incorrect values. This is unfortunately unavoidable since there is no way to tell how many times a counter has wrapped around during a sampling interval.

Figure 5:
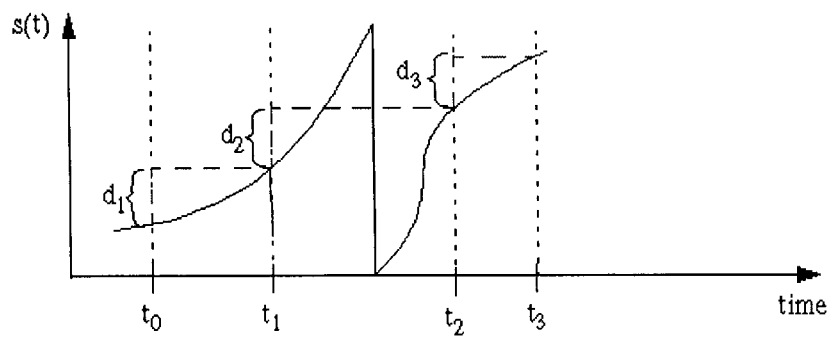
FIG. 5 shows another example of undetected wrap-around.

Another anomaly that may occur is a wraparound followed by a fast growth of the counter, illustrated in FIG. 5. In that case we will not De able to detect any wrap-around at all, and the computed value will be significantly smaller than reality.

The only way to alleviate these two problems is to increase the sampling frequency—within reasonable limits, or increase the size of the registers in the network elements.

Normalisation of Measurement Interval

As discussed previously, especially in case of derived object computation, we need to deliver values at exact times. In order to achieve this, we will assume that the growth of the counter is linear through the sampling interval.

Figure 6:
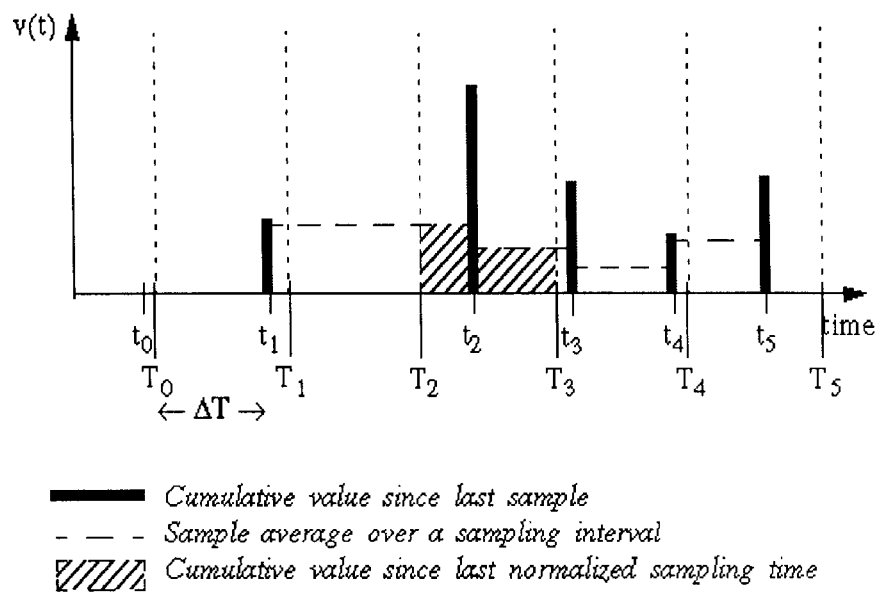
FIG. 6 shows normalisation of sampling interval.

In FIG. 6, $v(T_3)$ is the sum of the areas delimited by the averages and the sampling times.

Figure 7:
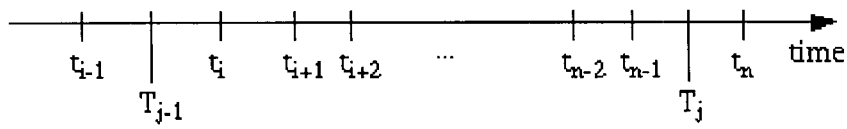
FIG. 7 is a time series showing the relationship between sampling times and normalised sampling times.

Let $t_k$, k ∈ [0, —>>be the sampling times, and $T_k$. k ∈ [0, —>>the normalized sampling times. Assuming that $t_i$ is the first sampling time after $T_{j-1}$ and $t_n$ is the first sampling time after $T_j$ as illustrated in FIG. 7.

The measurement value at time $T_j$ can be expressed as $$v(T_j) = \frac{v(t_i)*(t_i - T_{j-1})}{t_i - t_{i+1}} + \sum_{k=i+1}^{n-1} v(t_k) + \frac{v(t_n)*(T_j - t_{n-1})}{t_n - t_{n-1}}$$

During a sampling interval $<t_{i-1}, t_i]$, the average measurement value is the quotient of $v(t_i)$ and the length of the interval. By multiplying this average with time elapsed, we obtain the cumulative value between two in termediary times within the interval.

Calculation Layer

The role of the Calculation Layer is to retrieve the required data from the presentation layer, perform adequate calculations on those data if necessary i.e. if the object requested was a derived object, and return data for the requested object.

If the requested object is a derived object, the Calculation layer must request normalised measurement values for each real measurement object that appears in the derived object formula, apply the formula to the data and return the resulting data set.

Otherwise the Calculation Layer retrieves values for the requested measurement object from the Presentation Layer. No time normalisation is required since the primary goal of time normalisation is to obtain measurement values for different objects that are comparable.

ADVANTAGES

Time-normalisation of collected samples enables comparison and correlation of performance data values either manually through analysis of graphical presentation of the data, or by a performance analysis tool, when data are not collected simultaneously or are collected at different time intervals.

We provide the possibility of defining derived objects and present their values to a client as if they were real objects (collected from network elements), transparently.

CONCLUSIONS

We have presented an entire framework for presenting data objects collected from network elements, as well as so-called derived objects to performance analysis and reporting tools. We have specifically solved the problem of delivering data sampled at the virtually exact time, where the time is determined by the time of the first sample, and a fixed sampling frequency, so that ulterior processing stages are provided with and instantaneous image of the network. Although this is an approximation which exactitude depends on the sampling frequency, it is the best we can get given the techniques used for collection of samples from the network elements.

Figure 8:
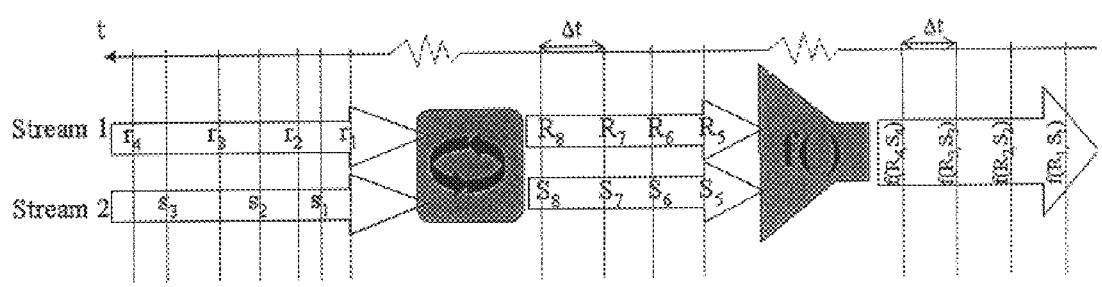
FIG. 8 illustrates the process according to the present invention.

The input to the process is one or more streams of samples for a time interval; one stream for each data object collected from a network element, in chronological order. Each stream is then processed by the presentation layer which output is the same streams as the input, but where the streamed data are rearranged so that each stream has a one datapoint for the specific times, at a specific frequency, still in chronological order, as illustrated in FIG. 8.

The final stage in the process consists of the calculation of the derived object, which results in a single data stream.

The result of the process can be used to generate human readable reports used for network planning or troubleshooting, right-sizing of the network capacity, Service Level Agreement (SLA) analysis and monitoring, traffic-based routing and even automatic correction of error conditions in the network.

What is claimed is:

1. A method for performance analysis of data networks, wherein data is collected as measurement samples v(t) from individual network elements at asynchronous sampling intervals, said data being stored in a Performance Database, wherein said database is maintained by a Performance Local Agent, which stores collected data in the database, retrieves data from the database on request from a client, normalizes said measurement samples v(t) to appear as normalized measurements v(T) sampled at exactly the same sampling times, processes the data into values that indicate the performance of the network and provides clients with a view of the resulting performance values, further wherein said measurement samples are normalized according to statistical estimation or linear interpolation method, and further wherein the sampled measurements v(t) are normalized according to the formula:

$$v(T_j) = \frac{v(T_i)*(t_i - T_{j-1})}{t_i - t_{i+1}} + \sum_{k=i+1}^{n-1} v(t_k) + \frac{v(t_n)*(T_j - t_{n-1})}{t_n - t_{n-1}}$$

where $t_k$ denotes the actual sampling time, $T_k$ denotes the normalized sampling time, k ∈ [0, —>>, $T_j$ is the time at which a measurement value is taken, $t_i$ is the first sampling time after $T_{j-1}$, and $t_n$ is the first sampling time after $T_j$.

2. The method of claim 1, wherein said network elements comprise event counters that count the traffic in a network element or the error rate, and gauges that measure the instantaneous resource usage.

3. The method of claim 2, wherein said measurement samples are retrieved from each network element using SNMP (Simple Network Management Protocol), FTP, or Telnet.

4. An arrangement for performance analysis of data networks, wherein data is collected as measurement samples from individual network elements at in-synchronous sampling intervals, said data being stored in a Performance Database, wherein the database is maintained by a Performance Local Agent, which includes a Performance Database Interface, a Presentation Layer and a Calculation Layer, the Performance Local Agent being adapted to store and retrieve said data in said database through the PDB Interface, for presentation to a client, wherein said data is retrieved as streams of measurement samples for each element, said streams of measurement samples are time normalized in the Presentation Layer into corresponding synchronous streams of samples, and the Calculation Layer is adapted to calculate values of derived objects from said synchronous streams of samples and to output the result as a single stream of values, the objects indicating the operating conditions in the network and providing the client with a view of the object, further wherein said measurement samples v(t) are normalized according to statistical estimation or linear interpolation method and further wherein the samples v(t) are normalized according to the formula:

$$v(T_j) = \frac{v(T_i)*(t_i - T_{j-1})}{t_i - t_{i+1}} + \sum_{k=i+1}^{n-1} v(t_k) + \frac{v(t_n)*(T_j - t_{n-1})}{t_n - t_{n-1}}$$

where $t_k$ denotes the actual sampling time, $T_k$ denotes the normalized sampling time, $k \in [0, \rightarrow\!\!>$, $T_j$ is the time at which a measurement value is taken, $t_i$ is the first sampling time after $T_{j-1}$, and $t_n$ is the first sampling time after $T_j$.

5. The arrangement of claim 4, wherein said network elements include event counters, that count the traffic in a network element or the error rate, and gauges that measure the instantaneous resource usage.

6. The arrangement of claim 5, wherein samples are retrieved from each network element using SNMP (Simple Network Management Protocol), FTP, or Telnet.

* * * * *